(12) United States Patent
Hogger et al.

(10) Patent No.: US 10,569,499 B2
(45) Date of Patent: Feb. 25, 2020

(54) PREFORM ELEMENT FOR THE PRODUCTION OF A MOTOR VEHICLE BODY

(71) Applicant: Bayerische Motoren Werke Aktiengesellschaft, Munich (DE)

(72) Inventors: Thomas Hogger, Otterfing (DE); Lukasz Goldyn, Munich (DE); David Becherer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 601 days.

(21) Appl. No.: 14/992,509

(22) Filed: Jan. 11, 2016

(65) Prior Publication Data

US 2016/0129667 A1   May 12, 2016

Related U.S. Application Data

(63) Continuation of application No. PCT/EP2014/064512, filed on Jul. 8, 2014.

(30) Foreign Application Priority Data

Jul. 12, 2013   (DE) .................. 10 2013 213 653

(51) Int. Cl.
| | |
|---|---|
| *B32B 5/02* | (2006.01) |
| *B32B 3/06* | (2006.01) |
| *B32B 3/26* | (2006.01) |
| *B32B 3/28* | (2006.01) |
| *B32B 5/26* | (2006.01) |

(52) U.S. Cl.
CPC ............. *B32B 5/024* (2013.01); *B32B 3/06* (2013.01); *B32B 3/263* (2013.01); *B32B 3/28* (2013.01); *B32B 5/26* (2013.01); *B32B 2605/08* (2013.01)

(58) Field of Classification Search
CPC ........... B32B 5/024; B32B 5/26; B32B 3/263; B32B 3/06; B32B 3/28; B32B 2605/08; B62D 29/048; B29B 11/16; B29L 2031/3055
See application file for complete search history.

(56) References Cited

U.S. PATENT DOCUMENTS

| | | | |
|---|---|---|---|
| 6,627,018 B1 * | 9/2003 | O'Neill | ............... B29C 44/1209 156/78 |
| 2006/0048890 A1 | 3/2006 | Sato et al. | |

(Continued)

FOREIGN PATENT DOCUMENTS

| | | |
|---|---|---|
| CN | 103732371 A | 4/2014 |
| CN | 104010926 A | 8/2014 |

(Continued)

OTHER PUBLICATIONS

Machine Translation of WO 2013/017601 A1. (Year: 2013).*

(Continued)

*Primary Examiner* — Brian Handville
(74) *Attorney, Agent, or Firm* — Crowell & Moring LLP

(57) ABSTRACT

A preform structure is provided for the body of a motor vehicle. The structure includes a preform element which is produced from stacked fiber mats and has a peripheral area which along an edge is inclined relative to a preform surface, so as in this way to offer a load-appropriate transition from one preform element to another.

19 Claims, 3 Drawing Sheets

(56) References Cited

U.S. PATENT DOCUMENTS

| | | | |
|---|---|---|---|
| 2009/0223588 A1* | 9/2009 | Dunleavy | F16C 7/026 |
| | | | 139/384 R |
| 2014/0225297 A1 | 8/2014 | Richard et al. | |
| 2014/0300138 A1 | 10/2014 | Gonda et al. | |
| 2015/0251707 A1 | 9/2015 | Keller | |

FOREIGN PATENT DOCUMENTS

| | | |
|---|---|---|
| CN | 104870297 A | 8/2015 |
| DE | 10 2007 019 738 A1 | 10/2008 |
| DE | 10 2008 057 783 B3 | 2/2010 |
| DE | 10 2010 004 530 A1 | 7/2011 |
| DE | 10 2011 089 044 A1 | 6/2013 |
| EP | 1 972 421 A1 | 9/2008 |
| EP | 1 995 040 A1 | 11/2008 |
| EP | 1 481 790 B1 | 1/2009 |
| EP | 2 345 529 A1 | 7/2011 |
| EP | 2 572 866 A1 | 3/2013 |
| EP | 2 345 529 B1 | 3/2016 |
| FR | 2 732 301 A1 | 10/1996 |
| WO | WO 2013/017601 A1 | 2/2013 |

OTHER PUBLICATIONS

Machine Translation of DE 10 2011 089 044 A1. (Year: 2011).*

English-language translation of Chinese Office Action issued in counterpart Chinese Application No. 201480038646.7 dated Dec. 12, 2016 (ten (10) pages).

International Search Report (PCT/ISA/210) issued in PCT Application No. PCT/EP2014/064512 dated Oct. 7, 2014 with English translation (eight pags).

German Search Report issued in counterpart German Application No. 10 2013 213 653.6 dated Mar. 13, 2014 with partial English translation (11 pages).

German-language Written Opinion (PCT/ISA/237) issued in PCT Application No. PCT/EP2014/064512 dated Oct. 7, 2014 (five pages).

* cited by examiner

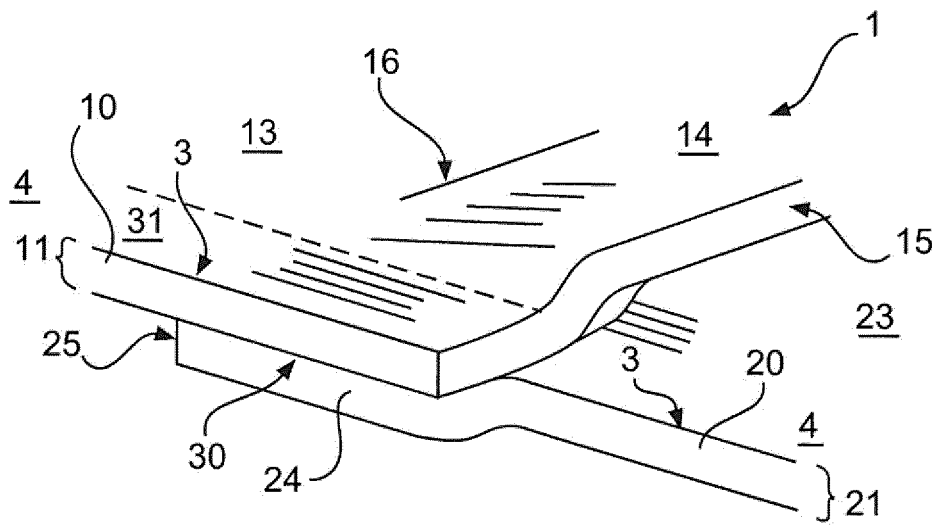
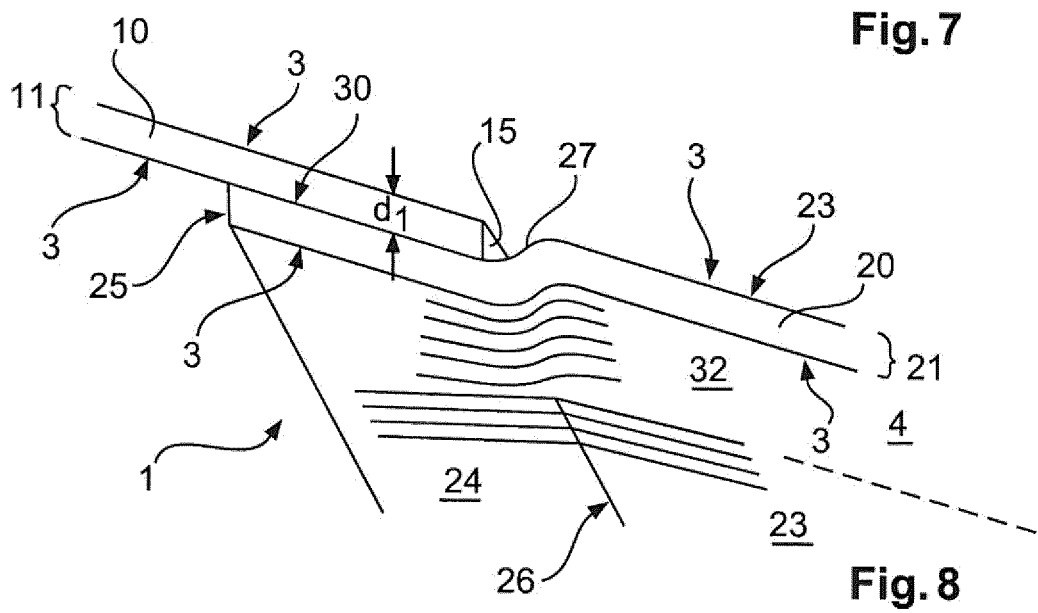
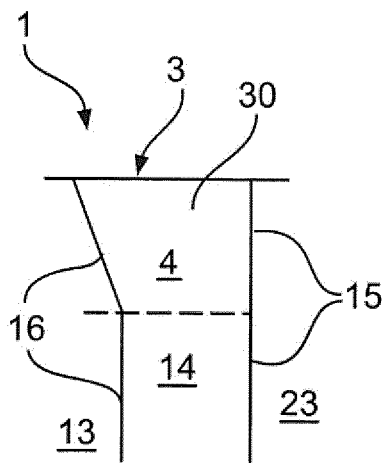
Fig. 9
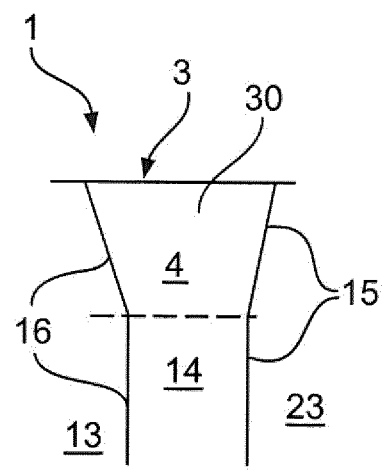
Fig. 10
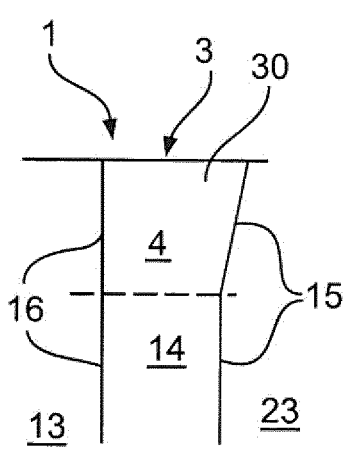
Fig. 11

PREFORM ELEMENT FOR THE PRODUCTION OF A MOTOR VEHICLE BODY

CROSS REFERENCE TO RELATED APPLICATIONS

This application is a continuation of PCT International Application No. PCT/EP2014/064512, filed Jul. 8, 2014, which claims priority under 35 U.S.C. § 119 from German Patent Application No. 10 2013 213 653.6, filed Jul. 12, 2013, the entire disclosures of which are herein expressly incorporated by reference.

BACKGROUND AND SUMMARY OF THE INVENTION

The present invention relates to a motor vehicle having a body with a preform element or a preform structure, and in particular to a motor vehicle having a body with a preform structure that allows an optimized connection between two or more preform elements.

In the automotive industry, the increase in electrically operated vehicles is being accompanied by a growing demand for lightweight and also resource-conserving solutions for increasing energy efficiency. Fiber composite materials are becoming ever more established in association with lightweight construction.

On account of their outstanding mechanical properties, components of carbon-fiber-reinforced plastic form a major group among the fiber composite materials. The numerous advantages of carbon-fiber-reinforced plastic components over conventional components, such as for example great stiffness, corrosion resistance, stress-appropriate design, etc., are consequently also of interest for the automotive industry.

On account of the production sequences in the automotive industry, so-called performs or preform elements, which have already been brought into a form adapted to the application, are used. Preforms and preform elements, or preforms for short, are often produced from a layering of fiber mats, which are placed together and cut, and already brought into the necessary three-dimensional form.

Because of the sometimes complex structures in automobile construction, often two or more preforms or preform elements are connected together to form an overall structure. In an interfacial region, the individual preforms or preform elements have to be connected. Since a butt joint is generally not advisable for reasons of stability, the connection generally takes place by an overlapping of the adjoining border regions.

In spite of overlapping, it is generally intended to avoid a step, at least on one side of the connection. Since the preforms or preform elements have a certain wall thickness, in a preform element the border region is often cranked, i.e. has a double bend, in which the level of the surface is set back by the material thickness of the adjoining preform element.

In the case of fiber composite materials, in particular also carbon-fiber-reinforced plastics, there is a material-weakening offset of the wall in this region. In order to achieve a minimum stability, reinforcement would be necessary in the region of a weakening of the material, but in turn results in an increase in weight.

Against this background, an object of the present invention can be considered to be that of providing a preform structure that has a greater stability with regard to a connection of two or more preform elements with the same weight or a lower weight with the same stability.

According to an embodiment of the invention given by way of example, a motor vehicle including a body with preform elements is provided, having a first stack of a plurality of fiber mats with a common first outer contour, a first preform area, a first preform border region and a first preform edge.

The first preform edge delimits at least part of the outer contour, wherein the first border region extends between the preform area and the first preform edge, wherein the preform border region is separated from the preform area adjoining it by a first bend and the first border region is inclined with respect to the first preform area adjoining it.

In this way it is possible to provide a preform element which, on account of its inclined and angled-away border region, can be connected to a corresponding part of a further preform element, so that a weak point created by a crank (elbow) can be avoided.

According to a further embodiment of the invention given by way of example, a motor vehicle having a body with a preform structure is provided, with a preform element as described above and a second preform element. The second preform element has a second stack of a plurality of fiber mats with a common second outer contour, a second preform area, a second preform border region and a second preform edge.

The second preform edge delimits at least part of the second outer contour, wherein the second border region extends between the second preform area and the second preform edge. The first border region and the second border region form an overlap.

In this way it is possible to provide a preform structure that is made up, for example, of two preform elements, wherein a material-weakening crank or double step in a preform structure can be avoided at the connecting region between the first preform element and the second preform element by the configuration of a bent-away and inclined border region of at least one preform element.

It is important here that the preform elements can be prefabricated separately, and can be connected to one another in the prefabricated form. In particular, the configuration of the previously described preform structure with the preform elements makes it possible for example to avoid individual fiber layers alternately overlapping one another in the border region of the two preform elements.

By contrast with the embodiment described above, fabrication of preforms is not possible when there is an alternating overlap of the individual fiber layers of two adjoining fiber layer stacks. Rather, the individual fiber layers must be individually laid on in an adjoining overlapping manner, which inevitably means that a great amount of work is involved. In the case of a preform, however, the prefabrication is performed on the basis of the form and dimensions of a fiber layer stack.

Therefore, a connection of the preform elements must be performed in some way other than an alternating overlap of individual layers. In particular, the preform structure according to the invention can also be used in the fabrication of large numbers of articles, particularly because a time-consuming alternating overlap of the adjoining fiber layer stacks can be avoided by the special configuration of the preform border regions with an inclination and a bend in delimitation with respect to an adjoining preform area.

According to an embodiment of the invention given by way of example, the fiber mats are carbon fiber mats. In this way it is possible to provide a lightweight material that has great stability and, according to current knowledge, is harmless with respect to both environmental and health aspects.

According to embodiments of the invention given by way of example, the carbon fiber mats are woven. In this way it is possible to provide a structure of a fiber mat that is in itself already pre-stabilized. In addition, it is possible to apply different weaving patterns, which are in particular reflected in different forms that a fiber mat stack is intended to take.

According to an embodiment of the invention given by way of example, the carbon fiber mats are laid in such a way that the carbon fibers are aligned substantially the same and are stitched transversely. In this way, an increase in the thickness of the carbon fiber mats can be avoided by a laid structure, in particular if a thread for the transverse stitching is thinner than the stitched carbon fiber structure.

According to an embodiment of the invention given by way of example, the second preform border region is separated from the second preform area adjoining it by a second bend and the second border region is inclined with respect to the second preform area adjoining it. In this way, the at least two preform elements have border regions bent away in a coinciding manner, so that a substantially symmetrical connection can be produced in the overlapping region.

According to an embodiment of the invention given by way of example, the first preform border region and the second preform border region, respectively, abut one another in an overlapping manner on one side, which lies away from the respective bending direction. In this way it is possible to produce a connection in which the two preform areas of the two preform elements adjoining one another can lie on a plane without an offset in relation to one another, while the preform border regions can overlap one another as a result of the bending away.

According to an embodiment of the invention given by way of example, the second border region has an increasing reduction of a material thickness of the second preform element in the direction of the second preform edge. In this way it can be achieved that the preform structure is not obtrusive in the overlapping region on one side, and consequently a uniform, continuous level of the two preform areas and of the overlapping region is possible.

According to an embodiment of the invention given by way of example, the overlap is widened in the direction of an edge of the preform structure in a structure edge region. In this way it can be achieved that there is a greater overlap in particular in an edge region that is usually subjected to greater stress, and consequently the edge stability of the preform structure is reinforced, in particular, in the transitional region from a first preform element to a second preform element.

According to an embodiment of the invention given by way of example, at least one out of the first border region and the second border region has a smaller material thickness than the material thickness of the corresponding adjoining preform area in such a way that a set-back step is created at the corresponding bend on the side facing away from the bending direction.

In this way, the overlapping region can be made thinner, so that the overlapping region has a smaller thickness than the sum of the material thickness in the first preform area region and the material thickness in the second preform area region. In other words, with the same material thickness of the two preform areas, the overlapping region can be made thinner than twice the material thickness.

According to an embodiment of the invention given by way of example, the first border region goes over laterally in the direction of and up to a structure edge into a first border edge region, and the second border region goes over laterally in the direction of and up to the structure edge into a second border edge region.

One out of the first border edge region and the second border edge region is unbent with respect to the corresponding adjoining preform area and the other out of the first border edge region and the second border edge region is set back in the bending direction with respect to the corresponding preform area in the overlapping region by a material thickness of the one preform element.

The side of the one border edge region facing away from the overlap and the area oriented in the same direction of the preform area adjoining the other border edge region have a coinciding level.

In this way, one and the same level of the preform element areas and the overlapping region can be provided in particular in a structure edge region on one side, so that, for example, flat-abutting flanges can be applied to the preform structure, in particular in the border region. In particular, the flanges can in this way be fabricated unbent, bringing about the advantageous effect of the preform structure with bent-away edge regions away from the structure edge regions.

It should be understood that the individual features described above are of course also combined with one another, whereby in some cases even advantageous effects that go beyond the sum of the individual effect can be obtained.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 is a perspective view of a preform structure in which a uniform level of the preform area is established on one side in a border region of the structure, while in a region adjoining thereto the preform border region is bent with respect to the preform area;

FIG. 8 is a perspective view of the arrangement shown in FIG. 7, from the opposite side;

FIG. 9 shows a widened overlap in a border region of the structure according to a first embodiment of the invention;

FIG. 10 shows a widened overlap according to a second embodiment of the invention; and FIG. 11 shows an overlapping border region of the structure with widened overlapping according to a third embodiment of the invention.

DETAILED DESCRIPTION OF THE DRAWINGS

Figure 1:
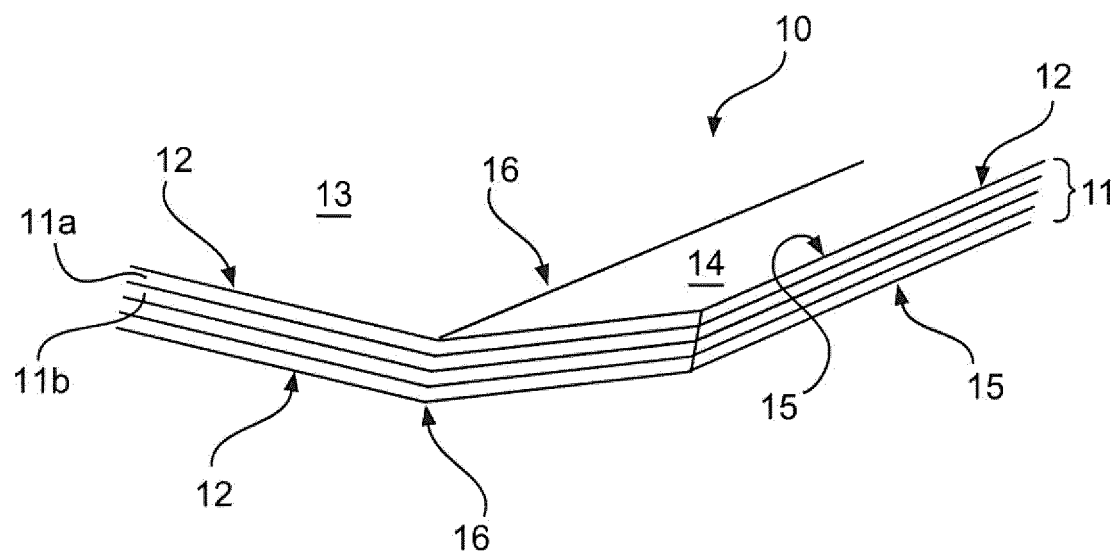
FIG. 1 is a schematic view of an exemplary embodiment of a preform element.

FIG. 1 shows a preform element 10 having a stack of fiber mats 11, wherein the fiber mats 11a, 11b have been stacked to form the stack 11. In FIG. 1, four fiber mats are shown by way of example, though the invention is, of course, not restricted to the four stacked fiber mats but may also have a lower or higher number of fiber mats.

The preform element 10 has a first preform area 13, which generally represents the main areal extent of the preform element. In addition, the preform element 10 has a preform border region 14, which is provided as an adjoining region to which a further preform element can be connected. The border region 14 denoted here does not have to extend around the entire area 13.

Rather, the border region 14, in particular an overlapping border region, may only cover a partial periphery. In the embodiment shown in FIG. 1, the preform border region 14 of the preform element 10 is delimited from the preform area region 13 by a bend 16, wherein the preform border region is inclined with respect to the area region 13. The border region 14 in this case extends between an area region 13 and the preform edge 15. The entire preform element 10 is delimited by a first outer contour 12.

It should be understood that, although FIG. 1 shows a border region only at one edge region or partial outer contour region, the preform element may also be provided with a border region that runs around a corner or even a border region 14 that runs around the entire periphery and that may be bent with respect to the preform area by a corresponding bend. For the sake of simplicity, just a one-dimensional bend is shown here for purposes of explanation, though the bend 16 and also the border region may also be bent or extend around corners.

Figure 2:
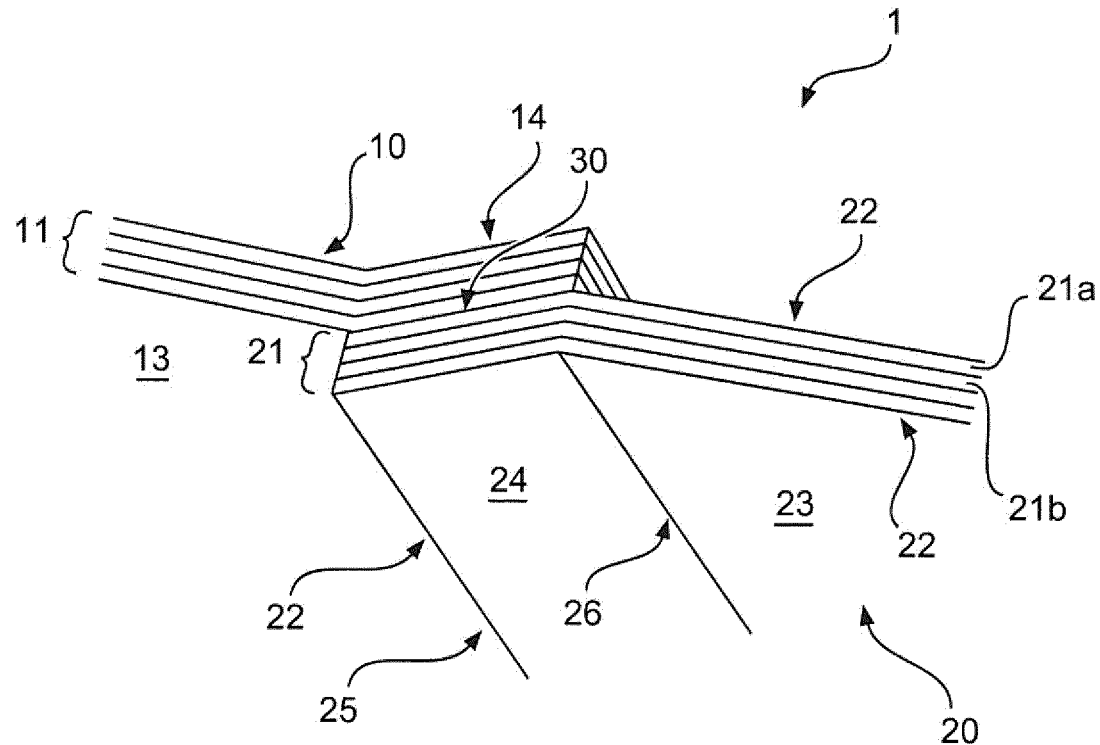
FIG. 2 is a schematic diagram of an exemplary embodiment of a preform structure with a first preform element and a second preform element.

FIG. 2 shows an embodiment given by way of example of a preform structure, which in the embodiment shown here consists of a first preform element 10 and a second preform element 20. The two preform elements 10 and 20 are constructed in a substantially coinciding manner in the embodiment shown in FIG. 2.

The preform element 20 is also made up here of a second stack of a plurality of fiber mats 21a, 21b, which together form the stack 21. Here, too, it should be understood that the number of fiber mats may also be greater or less than the four fiber mat stack shown here. In particular, the number of fiber mats for the first preform element may also be different than the number of fiber mats of the second preform element.

In the embodiment shown in FIG. 2, the second preform element is also provided with a bend 26, which delimits the border region 24 from the area region 23, wherein the border region 24 extends between the preform edge 25 and the bend 26. Here, too, the second preform element 20 is delimited by an outer contour 22, though in FIG. 2 the preform border region 24 only extends along a partial outer contour.

It goes without saying that a corresponding border region with a bend, at which for example a further, for example third, preform element can be connected, may also be provided on the side facing the viewer. The configuration of the two border regions with an angled bend allows the two preform areas 13 and 23 of the first preform element 10 and the second preform element 20 to be arranged on one level (in one plane), without a crank having to be provided at the preform border region, among the effects of which could be that the material of the preform is weakened significantly.

FIGS. 3, 4, 5 and 6 show, respectively, embodiments of the invention by way of example in a sectional view, the reference signs used there coinciding with the reference signs that are used in FIGS. 1 and 2.

Figure 3:
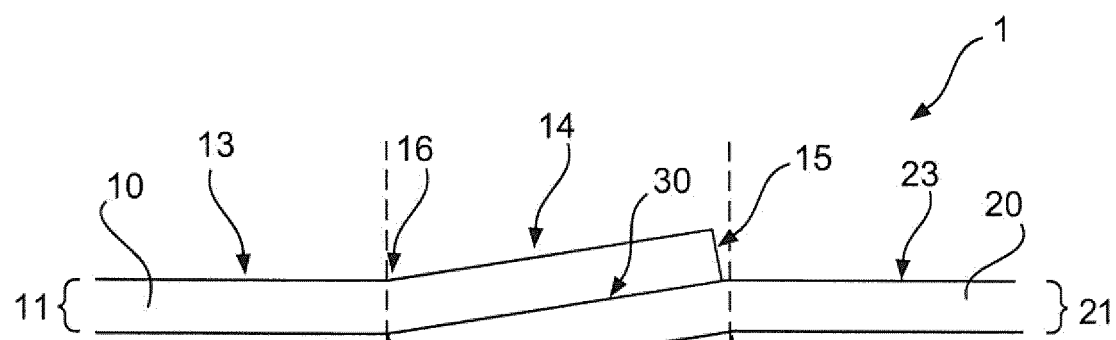
FIG. 3 is a sectional view of a preform structure according to an exemplary embodiment of the invention by analogy with FIG. 2.

FIG. 3 shows a sectional view of a preform structure as it is represented in FIG. 2. In FIG. 3 it can be seen that the border regions 14 and 24 of the first and second preform elements 10, 20 have an overlap 30, wherein the preform areas 13 and 23 are on one level or in one plane.

FIG. 3 shows an embodiment in which the border region 14 of the first preform element is bent upward with respect to the preform area 13, while the border region 24 of the second preform element 20 is bent downward.

Figure 4:
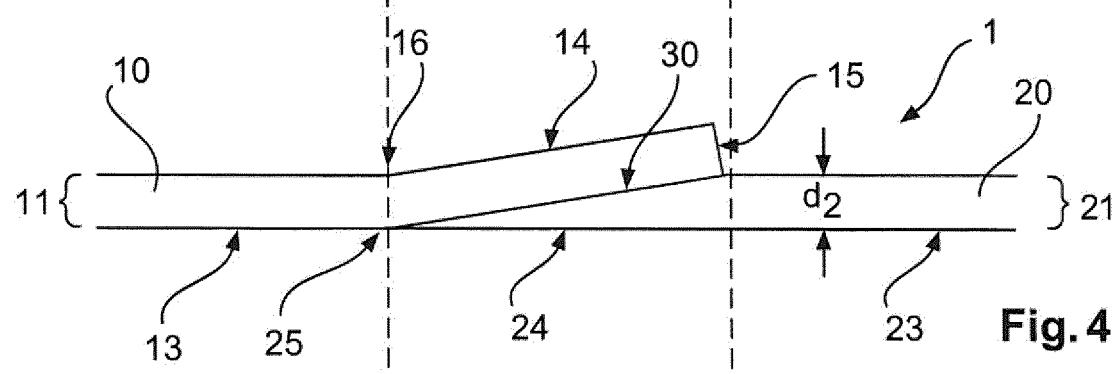
FIG. 4 is an exemplary embodiment of a preform structure according to the invention with a border region of the second preform element of which the material thickness decreases continuously in the direction of the second preform edge.

FIG. 4 shows an embodiment in which the first preform element 10 is substantially the same as the first preform element of FIG. 3. However, in this case the second preform element 20 does not have a border region 24 that has a bend 26, whereby the border region 24 is inclined with respect to the preform area 23. Rather, the material thickness d2 in the second border region 24 of the second preform element 20 decreases continuously in the direction of the second preform edge 25.

In this way it can be achieved that on one side of the preform structure both the level of the first preform area 13 and of the second preform area 23 and the level of the border region 24 of the second preform element are on one level and can be fabricated substantially without any steps. In particular, in FIG. 4 there are no structures protruding beyond the level of the areas.

It should be understood that, when reference is made to the level of the preform areas 13 and 23, the same orientations of the areas are intended, in particular when these areas are arranged on one level. Thus, for example, in FIG. 4, what is meant by the preform areas 13 and 23 is the downwardly directed areas, which are on one and the same level as the border region 24.

Figure 5:
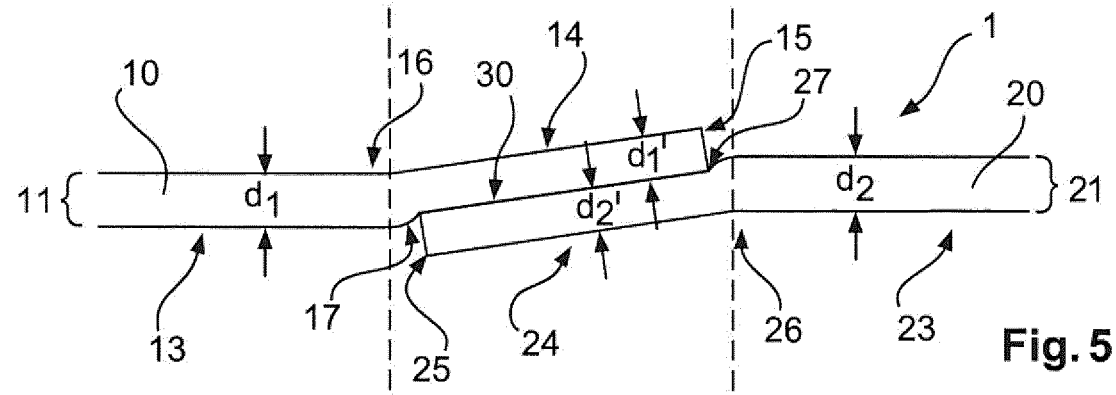
FIG. 5 is an exemplary embodiment of the invention in which the material thickness in the overlapping region is smaller than the sum of the material thicknesses of the two adjoining preform elements.

FIG. 5 shows an embodiment which has a basic structure that is similar to that of FIG. 3. In this case, both the first preform element 10 and the second preform element 20 respectively have a bend 16 and 26, respectively, wherein the corresponding border regions 14 and 24 are inclined with respect to the preform areas 13 and 23, respectively.

However, the material thickness d1' of the border region 14 in the embodiment shown in FIG. 5 is smaller than the wall thickness d1 of the area region 13. By analogy, the material thickness d2' of the border region 24 is smaller than the wall or material thickness d2 of the area region 23. In this way, the overlapping region 30 can be created with a smaller wall thickness than the sum of the two wall thicknesses d1+d2.

Such a reduction of the wall thickness may take place for example by pressing of the fiber mats in the overlapping region 30, whereby the wall thicknesses d1' and d2' are reduced in comparison with the original wall thicknesses d1 and d2. It should be understood that it is also possible for the wall thickness of only one preform element to be reduced in the border region, while the border region of the other preform element has a material thickness that substantially coincides with the area region, for instance as the result of a prepressing of a border region. Such pressing of the overlapping region 30 may have the effect of producing corresponding steps 17 and 27, which mark the transition from the smaller wall thickness d1' to the greater wall thickness d1 or from d2' to d2, respectively.

Figure 6:
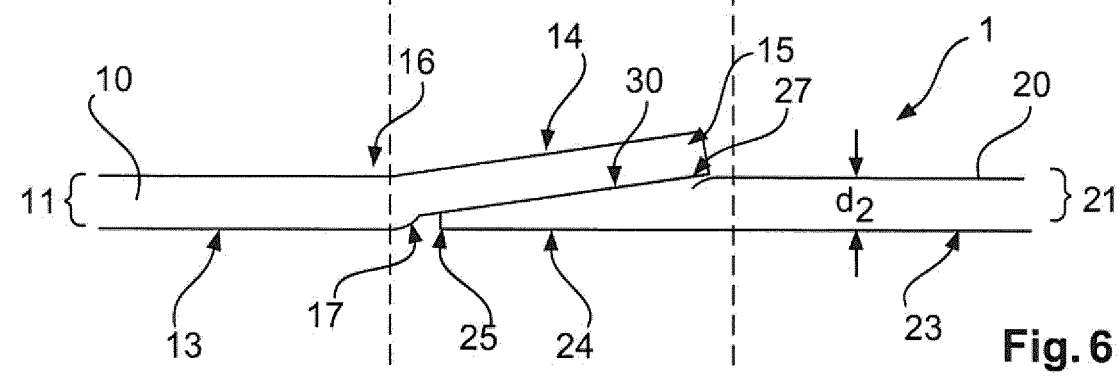
FIG. 6 is an exemplary embodiment of the invention by analogy with FIG. 5, in which the material thickness in the border region of the second preform element decreases continuously in the direction of the preform edge.

FIG. 6 shows a further embodiment, which shows an increasing reduction of the material thickness of the second preform element in the second border region 24, here too there being corresponding steps 17 and 27, which represent a transition from a smaller wall thickness to a greater wall thickness. It should be understood that the depressions produced at the steps can be filled, for example, with a binding resin, so that corresponding notching forces in this region can be reduced.

With respect to the bend 16 or 26, it should be noted that these bends may also be bends without sharp edges, so that in this region there may also be certain radii, in particular to avoid sharp-edged bends that under some circumstances may cause a weakening of the material.

It should be understood that, when they are abutting one another in the overlapping region 30, the corresponding border regions 14 and 24 may also protrude beyond the corresponding bends of the opposite preform element. A leveling may then be performed for example by later removal of the protruding regions of the border region.

FIGS. 7 and 8 show an embodiment of a preform structure that has, starting from a structure edge 3, a structure edge region 4, which has a substantially continuous level on one side. In this case, a crank may be provided in this structure edge region 4 in one of the two preform elements shown, whereby the material is set back by the material thickness of the opposite preform element.

In FIG. 7, the material in the border region 24 of the second preform element 20 is set back by a material thickness of the first preform element 10, so that the area that is upwardly directed here has a substantially continuous level. Only in a region that lies outside the structure edge region identified by the dashed line is there then a corresponding bend and a corresponding inclination of the border regions 14 and 24, respectively, so that in the region beyond the dashed line, that is to say outside the structure edge region, a cross-sectional structure analogous for example to that of FIG. 3 is obtained.

As FIGS. 7 and 8 reveal, the border edge region 31 of the first preform element in this case runs substantially without any inclination or offset, while the second border edge region of the second preform element has an offset in the structure edge region.

FIGS. 9, 10 and 11 show different embodiments of an overlap 30 of the border regions 14, 24, here in a plan view, in which the first preform element lies above the second preform element in the overlapping region, so that at this location the first border region 14 lies on top. In this case, a widening of the overlap 30 is provided in a structure edge region 4 between a structure edge 3 and the corresponding preform areas 13 and 23, respectively.

In FIG. 9 it is shown that the first preform edge runs substantially straight, the flared bend 16 making a widened overlap possible, while the border region 24 that is not visible here, because it is concealed, has in the region of the overlap 30, for example analogous to the bend profile 16, its second preform edge 25 (here likewise concealed, cannot be seen). By analogy with this, the preform edge profile 15 may also have a bend or a flare, as shown in FIGS. 10 and 11. The bend 16 may in this case run straight in the direction of the structure edge 3.

It should be understood here that the overlapping region 30 is located between the bend profile 16 and the first preform edge 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a body of the motor vehicle, the body of the motor vehicle having a preform element, the preform element comprising:
a first stack of a plurality of fiber mats having a common first outer contour, a first preform area, a first preform border region and a first preform edge, wherein
the first preform edge delimits at least part of the outer contour,
the first preform border region extends between the first preform area and the first preform edge, and
the first preform border region is separated from an adjoining part of the first preform area via a first bend and the first preform border region is inclined with respect to the adjoining part of the first preform area;
a second preform element, the second preform element comprising:
a second stack of a plurality of fiber mats having a common second outer contour, a second preform area, a second preform border region and a second preform edge, wherein
the second preform edge delimits at least part of the second outer contour,
the second border region extends between the second preform area and the second preform edge, and
the first border region of the preform element and the second border region of the second preform element overlap one another on one side which faces away from a bend direction.

2. The motor vehicle according to claim 1, wherein the fiber mats of the first and second preform elements are carbon fiber mats.

3. The motor vehicle according to claim 2, wherein the carbon fiber mats are woven carbon fiber mats.

4. The motor vehicle according to claim 2, wherein the carbon fibers mats are laid such that carbon fibers of the carbon fiber mats are aligned substantially in a same direction and are stitched transversely thereto.

5. The motor vehicle according to claim 1, wherein:
the second preform border region is separated from an adjoining part of the second preform area by a second bend, and
the second preform border region is inclined with respect to the adjoining part of the second preform area.

6. The motor vehicle according to claim 1, wherein the first preform border region and the second preform border region respectively abut one another in an overlapping manner on one side, said one side facing away from the respective bending direction.

7. The motor vehicle according to claim 1, wherein the second border region of the second preform element has an increasingly reduced material thickness in a direction of the second preform edge.

8. The motor vehicle according to claim 1, wherein the overlap in a structure edge region is widened in a direction of an edge of the preform structure.

9. The motor vehicle according to claim 1, wherein
at least one of the first border region and the second border region has a smaller material thickness than a material thickness of a corresponding adjoining preform area such that a set-back step is created at the corresponding bend on the side facing away from the bending direction.

10. The motor vehicle according to claim 1, wherein:
the first border region extends over laterally in a direction of and up to a structure edge into the first border edge region,
the second border region extends over laterally in a direction of and up to the structure edge into the second border edge region,
one of the first border edge region and the second border region is not bent with respect to the corresponding adjoining preform area,
the other of the first border edge region and the second border edge region is set-back in a bending direction with respect to the corresponding preform area in the overlap region by a material thickness of the one preform element, so that a side of the first border edge region facing away from the overlap and the preform area oriented in the same direction of the adjoining preform area of the second border edge region have a coinciding level.

11. A motor vehicle, comprising:
a body having a preform element, the preform element comprising:
    a first stack of a plurality of fiber mats having a common first outer contour, a first preform area, a first preform border region and a first preform edge, wherein
    the first preform edge delimits at least part of the outer contour,
    the first preform border region extends between the first preform area and the first preform edge, and
    the first preform border region is separated from an adjoining part of the first preform area via a first bend and the first preform border region is inclined with respect to the adjoining part of the first preform area, wherein
        the body comprises a preform structure including the preform element and a second preform element, the second preform element comprising:
            a second stack of a plurality of fiber mats having a common second outer contour, a second preform area, a second preform border region and a second preform edge, wherein
                the second preform edge delimits at least part of the second outer contour,
                the second preform border region extends between the second preform area and the second preform edge, and
                the first preform border region of the preform element and the second preform border region of the second preform element overlap one another, and wherein
                    at least one of the first preform border region and the second preform border region has a smaller material thickness than a material thickness of a corresponding adjoining preform area such that a set-back step is created at the corresponding bend on a side facing away from the bending direction.

12. The motor vehicle according to claim 11, wherein the fiber mats of the first and second preform elements are carbon fiber mats.

13. The motor vehicle according to claim 12, wherein the carbon fiber mats are woven carbon fiber mats.

14. The motor vehicle according to claim 12, wherein the carbon fibers mats are laid such that carbon fibers of the carbon fiber mats are aligned substantially in a same direction and are stitched transversely thereto.

15. The motor vehicle according to claim 11, wherein:
the second preform border region is separated from an adjoining part of the second preform area by a second bend, and
the second preform border region is inclined with respect to the adjoining part of the second preform area.

16. The motor vehicle according to claim 11, wherein
the first preform border region and the second preform border region respectively abut one another in an overlapping manner on one side, said one side facing away from the respective bending direction.

17. The motor vehicle according to claim 11, wherein the second preform border region of the second preform element has an increasingly reduced material thickness in a direction of the second preform edge.

18. The motor vehicle according to claim 11, wherein the overlap in a structure edge region is widened in a direction of an edge of the preform structure.

19. The motor vehicle according to claim 11, wherein:
the first preform border region extends over laterally in a direction of and up to a structure edge into the first preform border edge region,
the second preform border region extends over laterally in a direction of and up to the structure edge into the second preform border edge region,
one of the first preform border edge region and the second preform border region is not bent with respect to the corresponding adjoining preform area,
the other of the first preform border edge region and the second preform border edge region is set-back in a bending direction with respect to the corresponding preform area in the overlap region by a material thickness of the one preform element, so that a side of the first preform border edge region facing away from the overlap and the preform area oriented in the same direction of the adjoining preform area of the second preform border edge region have a coinciding level.

* * * * *